(12) United States Patent  (10) Patent No.: US 7,534,049 B2
Ohtsuki et al.  (45) Date of Patent: May 19, 2009

(54) WHEEL SUPPORT BEARING ASSEMBLY

(75) Inventors: Hisashi Ohtsuki, Iwata (JP); Masuo Takaki, Osaka (JP)

(73) Assignee: NTN Corporation, Osaka (JP)

( * ) Notice: Subject to any disclaimer, the term of this patent is extended or adjusted under 35 U.S.C. 154(b) by 381 days.

(21) Appl. No.: 10/571,057

(22) PCT Filed: Sep. 9, 2004

(86) PCT No.: PCT/JP2004/013123

§ 371 (c)(1),
(2), (4) Date: Mar. 7, 2006

(87) PCT Pub. No.: WO2005/026565

PCT Pub. Date: Mar. 24, 2005

(65) Prior Publication Data

US 2007/0065065 A1 Mar. 22, 2007

(30) Foreign Application Priority Data

Sep. 10, 2003 (JP) ............................. 2003-317862

(51) Int. Cl.
*F16C 33/64* (2006.01)
(52) U.S. Cl. .......................... 384/544; 384/513
(58) Field of Classification Search ............... 384/544, 384/589, 513; 29/898.066
See application file for complete search history.

(56) References Cited

U.S. PATENT DOCUMENTS

| 2,126,912 | A | * | 8/1938 | Murden | ................ | 29/898.066 |
| 3,528,271 | A | * | 9/1970 | Ponio | ................... | 29/898.066 |
| 4,060,290 | A | * | 11/1977 | Brawley | .................... | 384/571 |
| 5,261,159 | A | | 11/1993 | Yasuda et al. | | |
| 5,577,323 | A | | 11/1996 | Sawai et al. | | |
| 6,280,096 | B1 | | 8/2001 | Miyazaki et al. | | |
| 6,422,758 | B1 | | 7/2002 | Miyazaki et al. | | |
| 2001/0046339 | A1 | | 11/2001 | Miyazaki et al. | | |
| 2002/0146185 | A1 | | 10/2002 | Miyazaki et al. | | |
| 2003/0103705 | A1 | | 6/2003 | Miyazaki et al. | | |
| 2004/0252924 | A1 | * | 12/2004 | Kiuchi et al. | ............... | 384/492 |

FOREIGN PATENT DOCUMENTS

| JP | 50-131121 | | 10/1975 |
| JP | 60-170547 | | 9/1985 |
| JP | 60170547 | A * | 9/1985 |
| JP | 5-66215 | | 9/1993 |
| JP | 05-277615 | | 10/1993 |

(Continued)

OTHER PUBLICATIONS

Japanese Patent Office Preliminary Notice of Rejection, dated Nov. 21, 2006, and issued in corresponding Japanese Patent Application No. 2003-317862.

(Continued)

*Primary Examiner*—Thomas R Hannon (57) ABSTRACT

A wheel support bearing assembly includes an outer member and a hub axle having a wheel mounting flange and a raceway surface. The angle of the fiber flow relative to the raceway surface in the hub axle is chosen to be equal to or smaller than 15°. The angle of the fiber flow relative to a raceway surface of the outer member is also chosen to be equal to or smaller than 15°.

10 Claims, 9 Drawing Sheets

FOREIGN PATENT DOCUMENTS

| | | |
|---|---|---|
| JP | 6-170479 | 6/1994 |
| JP | 06-312601 | 11/1994 |
| JP | 11-129703 | 5/1999 |
| JP | 11-182642 | 7/1999 |
| JP | 2002-021858 | 1/2002 |
| JP | 2002-103905 | 4/2002 |
| JP | 2003-90350 | 3/2003 |
| JP | 2003-097569 | 4/2003 |

OTHER PUBLICATIONS

Japanese Patent Office Decision of Rejection, mailed Feb. 13, 2007, and issued in priority Japanese Patent Application No. 2003-317862.

Office Action issued in corresponding Chinese Patent Application No. 200480025928.X, mailed on Aug. 3, 2007.

Interrogatory with Reconsideration Report by the Examiner before Appeal issued May 27, 2008 in the corresponding Japanese Patent Application No. 2003-317862 (3 pages).

* cited by examiner

Fig. 1

Fig. 2A Bar Cutting ⇒ Heating ⇒ Upsetting ⇒ Preforming ⇒ Finish Forging ⇒ Boring Fig. 2B Bar Cutting ⇒ Heating ⇒ Upsetting ⇒ Preforming ⇒ Finish Forging ⇒ Boring Hub Axle and Outer Member Forging Step

WHEEL SUPPORT BEARING ASSEMBLY

This application claims the benefit of PCT International Application Number PCT/JP2004/013123 filed Sep. 9, 2004 and Japanese Application No. 2003-317862, filed Sep. 10, 2003, in Japan, the disclosures of which are incorporated herein by reference.

FIELD OF THE INVENTION

The present invention relates to a wheel support bearing assembly for rotatably supporting a vehicle wheel such as an automotive wheel.

BACKGROUND ART

Both of a hub axle and an outer race of the wheel support bearing assembly of a hub unit type are manufactured through a machining process that is effected subsequent to a forging process. The forging process is generally carried out by heating to about 1,100° C., a carbon steel bar containing, for example, 0.4 to 0.8% of carbon after such carbon steel bar has been cut in a sectional direction, followed by upsetting, preforming, finish-forging and boring.

Figure 11:
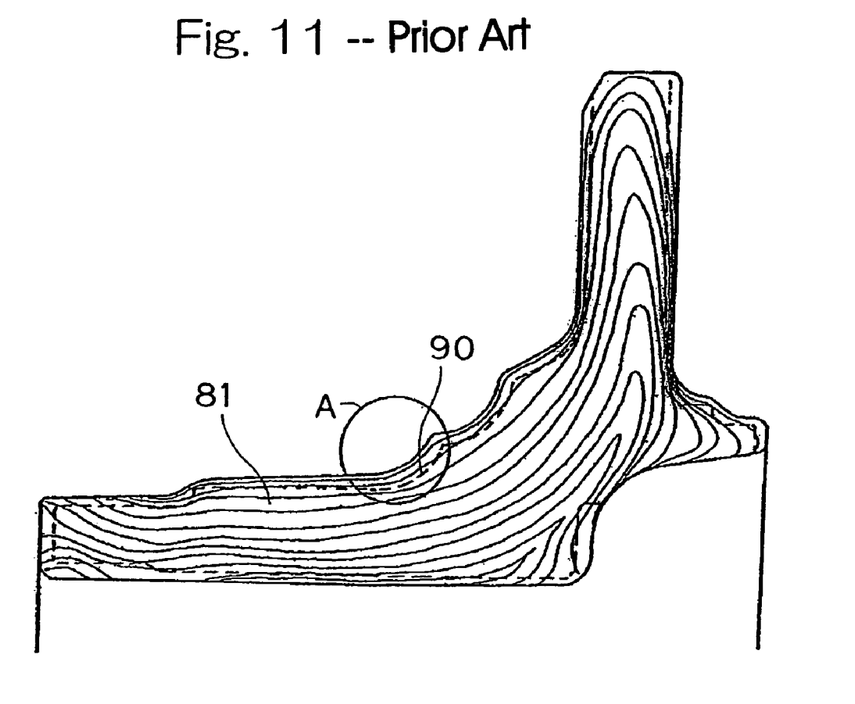
FIG. 11 is a sectional view, showing a material after completion of the forging step applied to the conventional hub axle.
Figure 13:
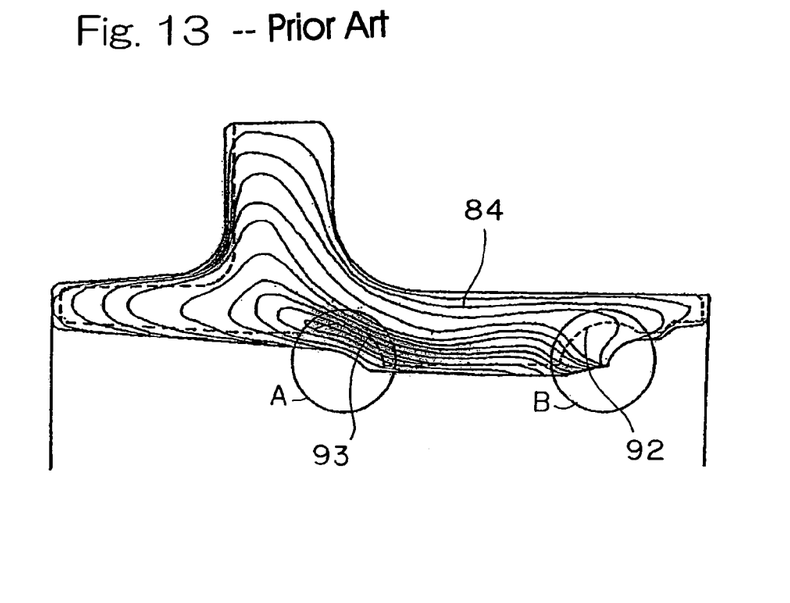
FIG. 13 is a sectional view, showing a material after completion of the forging step applied to the conventional outer race.

Since the hub axle and the outer race are each forged in the manner described above, the fiber flow exhibited by the carbon steel bar for the hub axle and that for the outer race after the forging process represent such as shown in FIG. 11 and FIG. 13, respectively. In those figures, the finished contour of the hub axle 81 and that of the outer race 84, both after the machining, are shown by broken lines, respectively.

Figure 12:
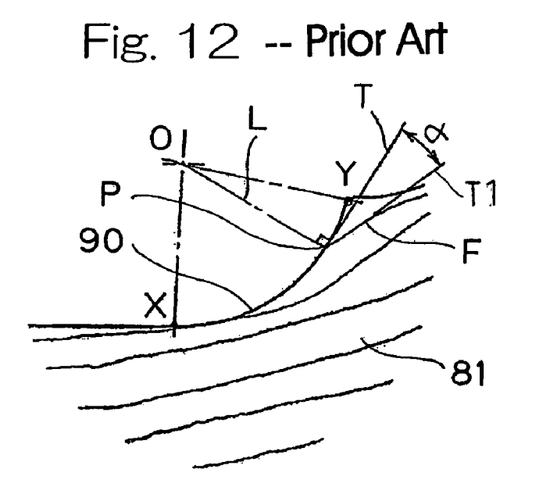
FIG. 12 is an enlarged sectional view, showing a portion marked by A in FIG. 11.
Figure 14A:
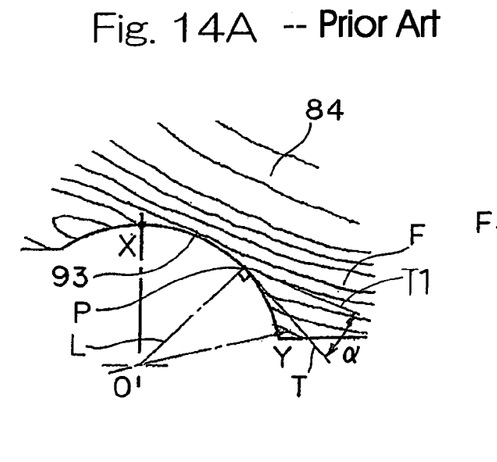
FIGS. 14A and 14B are enlarged sectional views, showing respective portions marked by A and B in FIG. 13.
Figure 14B:
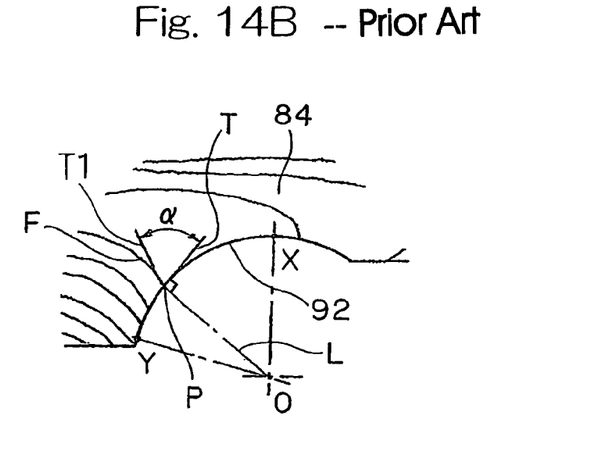

FIG. 12 illustrates an enlarged sectional view of a portion A of FIG. 11, showing a raceway surface 90 of the hub axle 81, which has been formed by machining. FIGS. 14A and 14B illustrate enlarged sectional views of portions A and B of FIG. 13, showing raceway surfaces 92 and 93 of the outer race 84, which have been formed by machining, respectively. In FIGS. 12 and 14, each of the raceway surfaces 90, 92 and 93 has the curvature with the center O. In the range of the curvature from an edge portion X in the bottom portion of each of the groove-shaped raceway surfaces 90, 92 and 93 where the curvature starts to another edge portion Y in the shoulder portion of each surface, the straight line L is drawn so as to connect between the center of curvature O and the point P at which the section of the fiber flow F precipitates and, on the other hand, the tangential line T is drawn to pass through the point P of intersection between the straight line L and each of the raceway surfaces. The angle α between the tangential line T1 of the fiber flow F and the tangential line T is obtained. This angle is defined as the angle α of the fiber flow F relative to the respective raceway surface.

This angle α of the fiber flow is related to the magnitude of the machining allowance (the difference between the shape of the forged raceway surface and the shape of the machined raceway surface for finish. There is a tendency that increase of the machining allowance is accompanied by increase of the angle α of the fiber flow. The angle α of the fiber flow varies between 15°<α<20° in the case of the hub axle 81 and between 15°<α<80° in the case of the outer race 84 which shows a large machining allowance.

The fiber flow F is a flow of material which is induced during formation of the bar, and impurities left unremoved during the steel manufacture somewhat exist in the bar. Those impurities exist along the fiber flow F. In general, under the normal lubricating condition, the fatigue life of the rolling bearing assembly is affected largely by impurities, particularly those of an oxidizing system, contained in the material. It is generally said that the duration of life decreases if the impurities are large and long and/or many in number.

While based on the result of experiments conducted using test pieces, there is a correlation between the angle of the fiber flow relative to the raceway surface and the life of the rolling bearing assembly, and it is known that with increase of the angle, the duration of life of the rolling bearing assembly decreases. Also, even in the wheel support bearing assembly, as compared with the manufacture thereof starting from the use of a pipe material, the manufacture thereof starting from the use of a rod material is said to result in lessening the possibility of the fiber flow being isolated or cut (See the Japanese Patent Publication No. 5-66215).

However, since the standard wheel support bearing assembly satisfies the rolling fatigue life that is currently required, no attention is basically paid to the fiber flow and the shape of the material before the machining is determined only by the reason of easiness to forge. However, the shape of the material before the machining, which is easy to forge, involves a large amount of the machining allowance and requires an increased number of machining steps. As a result thereof, the cost of manufacturing is increased and it does not lead to reduction of the cost of the product. On the other hand, even though the rolling life of the standard wheel support bearing assembly is currently satisfactory, it may be expected in the future that demands may increase to render the wheel support bearing assembly, that is, an automobile component part that is used under severe conditions, to have a longer rolling lifetime. Although the Japanese Patent Publication No. 5-66215 referred to above describes that as compared with the manufacture of the wheel support bearing assembly starting from the use of a pipe material, the manufacture thereof starting from the use of a round rod material can result in lessening the possibility of the fiber flow being isolated or cut, neither the ingenuity for minimization of the isolation or cut of the fiber flow nor any consideration on the angle of the fiber flow has been made. Also, the manufacturing method disclosed in the above mentioned patent publication is directed to a method of manufacturing a collarless outer race, and it is not clear as to whether the method disclosed can be extended or applied to the hub axle and the collared outer race.

DISCLOSURE OF THE INVENTION

An object of the present invention is to provide a wheel support bearing assembly, in which, by reducing the machining allowance of a raceway surface, the rolling life of the raceway surface can be increased and both the weight of material used and the length of time required to accomplish the machining process can be reduced.

A wheel support bearing assembly of the present invention is for rotatably supporting an automotive wheel relative to a vehicle body structure, which assembly includes an outer member having an outer periphery formed with a flange and also having an inner periphery formed with raceway surfaces, an inner member formed with raceway surfaces confronting the associated raceway surfaces in the outer member, dual rows of rolling elements interposed between the raceway surfaces in the inner member and the raceway surfaces in the outer member, respectively, and a sealing unit for sealing opposite open ends of an annular bearing space delimited between the outer and inner members. The inner member includes a hub axle formed with one of the raceway surfaces and a wheel mounting flange. The angle of the fiber flow relative to at least one of the raceway surface in the hub axle and the raceway surfaces in the outer member is chosen to be equal to or smaller than 15°. Each of the raceway surfaces have a sectional shape that is either arcuate to receive the rolling elements in the form of a ball or tapered to receive the rolling elements in the form of a tapered roller.

There is a correlation between the angle of the fiber flow relative to the raceway surface and the rolling life. With increase of the angle, the rolling life decreases. Considering the life ratio of each of the inner member and the outer member with respect to the fiber flow angle, selection of the fiber flow angle equal to or smaller than 15° has been found to result in obtaining the rolling lifetime substantially equal to that exhibited when the fiber flow angle is zero. Also, selection of the fiber flow angle equal to or smaller than 15° is effective to reduce the machining allowance for the raceway surface and, also, to reduce the weight of material used and the length of time required to accomplish the machining process.

In the present invention, although even if restriction of the fiber flow angle described above may be applied only to either the hub axle or the outer member, the above effects can be obtained on the hub axle or the outer member, such restriction of the fiber flow angle is preferably applied to both of the hub axle and the outer member.

Also, any of the fiber flow angle relative to the raceway surface in the hub axle and that relative to the raceway surface in the outer member is preferably equal to or smaller than 10°. In particular, the fiber flow angle relative to the raceway surface in the hub axle is chosen to be equal to or smaller than 10°. Accordingly, for example, the fiber flow angle relative to the raceway surface in the outer member may be chosen to be equal to or smaller than 15° and the fiber flow angle relative to the raceway surface in the hub axle may be chosen to be equal to or smaller than 10°.

The wheel support bearing assembly of the present invention can be applied to the type in which the outer member has no flange formed in the outer periphery.

Specifically, where the wheel support bearing assembly for rotatably supporting an automotive wheel relative to a vehicle body structure includes an outer member having an inner periphery formed with a plurality of raceway surfaces; an inner member formed with a plurality of raceway surfaces confronting the associated raceway surfaces in the outer member; dual rows of rolling elements interposed between the raceway surfaces in the inner member and the raceway surfaces in the outer member, respectively; and a sealing unit for sealing opposite open ends of an annular bearing space delimited between the outer and inner members, and the inner member includes a hub axle formed with one of the raceway surfaces and a wheel mounting flange, the fiber flow angle relative to the raceway surface in the hub axle is chosen to be equal to or smaller than 15°. Even in this case, the fiber flow angle relative to the raceway surface in the hub axle is more preferably chosen to be equal to or smaller than 10°.

Also, the present invention can be applied to the wheel support bearing assembly of, for example, a second generation type. Specifically, where the wheel support bearing assembly for rotatably supporting an automotive wheel relative to a vehicle body structure includes an outer member having an outer periphery formed with a flange and also having an inner periphery formed with a plurality of raceway surfaces; an inner member formed with a plurality of raceway surfaces confronting the associated raceway surfaces in the outer member; dual rows of rolling elements interposed between the raceway surfaces in the inner member and the raceway surfaces in the outer member; and a sealing unit for sealing opposite open ends of an annular bearing space delimited between the outer and inner members, the angle of fiber flow relative to each of the raceway surfaces in the outer member may be chosen to be equal to or smaller than 15°. Even this fiber flow angle is preferably equal to or smaller than 10°. In the case of this wheel support bearing assembly, either one of the outer member and the inner member may be a rotatable member. Where the outer member is a rotatable member, the flange on the outer periphery of the outer member serves as a wheel mounting flange, but where the inner member is a rotatable member, the flange on the outer periphery of the outer member serves as a vehicle body fitting flange.

The wheel support bearing assembly of the present invention may be such that the other of the raceway surfaces of the inner member may be formed on an inner race segment mounted on an outer periphery of one end of the hub axle. In other words, it may be a wheel support bearing assembly of a third generation type.

In the wheel support bearing assembly of the present invention, the inner member may include two inner races having respective raceway surfaces confronting the raceway surfaces provided in the outer member. In other words, it may be a wheel support bearing assembly of the second generation type. In such case, the wheel support bearing assembly may be an outer race rotating type or an inner race rotating type.

The wheel support bearing assembly of the present invention may be that of a fourth generation type.

In the wheel support bearing assembly of the present invention, the hub axle or the outer member, for which the fiber flow angle is specified as described above, may be made of a bearing steel or a carburized steel or a carbon steel having a carbon content within the range of 0.4 to 0.8%.

In the case of the steel member of those materials, the relation between each of the raceway surfaces and the fiber flow angle has been confirmed.

Since the wheel support bearing assembly of the present invention is such that the fiber flow angle relative to the raceway surface in the hub axle having its outer periphery provided with the wheel mounting flange is chosen to be equal to or smaller than 15° and/or the fiber flow angle relative to the raceway surface in the outer member having its outer periphery provided with a flange is chosen to be equal to or smaller than 15°, not only can the rolling life of the raceway surface be increased, but also the machining allowance of the raceway surface can be reduced and both the weight of material used and the length of time required to accomplish the machining process can be reduced.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

The first preferred embodiment of the present invention will be described with particular reference to FIGS. 1 to 7. This embodiment represents an example, in which the present invention is applied to a third-generation ball type wheel support bearing assembly of an inner race rotating model for the support of an automotive drive wheel. This wheel support bearing assembly includes an inner member 3, made up of a hub axle 1 and an inner race segment 2 mounted on an outer periphery of an inboard end of the hub axle 1, and an outer member 4 and is designed to rotatably support the automotive wheel relative to a vehicle body structure. The hub axle 1 has an outboard end provided with a wheel mounting flange 5. A plurality of wheel mounting bolts 8 are press-fitted into respective bolt insertion holes 7 that are defined in the flange 5 in a row circumferentially of the flange 5. Also, the hub axle 1 is in the form of a tubular member having a center bore 1a defined therein. The center bore 1a has a shaft portion of an outer coupling member of a constant velocity universal joint (not shown) inserted therein. The hub axle 1 and the inner race segment 2 has raceway surfaces 10 or 11 defined therein, respectively. The outer member 4 is made up of a single outer race and has its outer periphery formed with a vehicle body fitting flange 6. This flange 6 has a plurality of bolt insertion holes 9 defined therein in a row circumferentially thereof. The outer member 4 has raceway surfaces 12 and 13 confronting the raceway surfaces 10 and 11 in the hub axle 1 and the inner race segment 2, respectively. Double rows of rolling elements 14 are interposed between the mutually confronting raceway surfaces 10 and 12 and between the mutually confronting raceway surfaces 11 and 13, respectively. Each of the raceway surfaces 10 to 13 is rendered to have a contact angle, and this bearing assembly is an angular contact type. The rolling elements 14 are in the form of balls, for example, steel balls. Each of the rows of the rolling elements 14 is retained by a respective retainer 29. Opposite open ends of an annular bearing space delimited between the inner member 3 and the outer member 4 are sealed by sealing units 15 and 16. The sealing units 15 and 16 are secured to, for example, an inner peripheral surface of the outer member 4 and include contact sealing lips slidingly engageable with respective outer peripheral surfaces of the hub axle 1 and the inner race segment 2.

Figure 1:
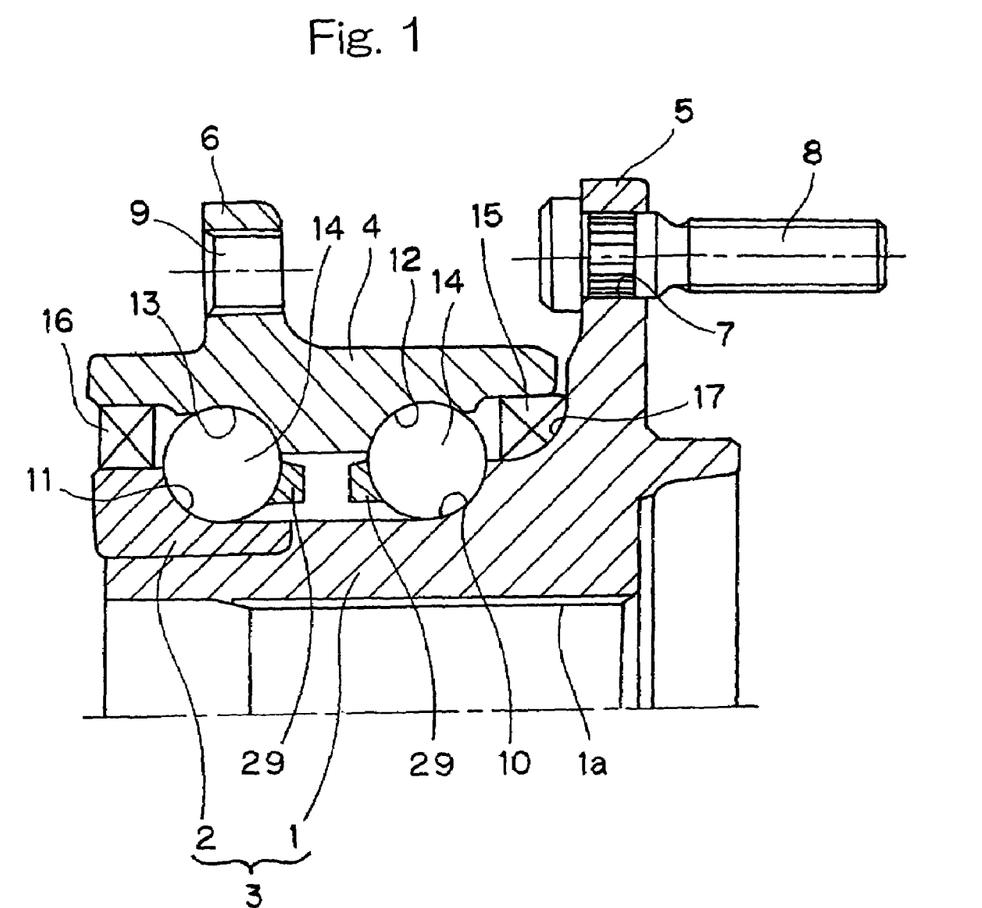
FIG. 1 is a fragmentary sectional view, showing a portion of a wheel support bearing assembly according to a first preferred embodiment of the present invention.
Figure 2A:
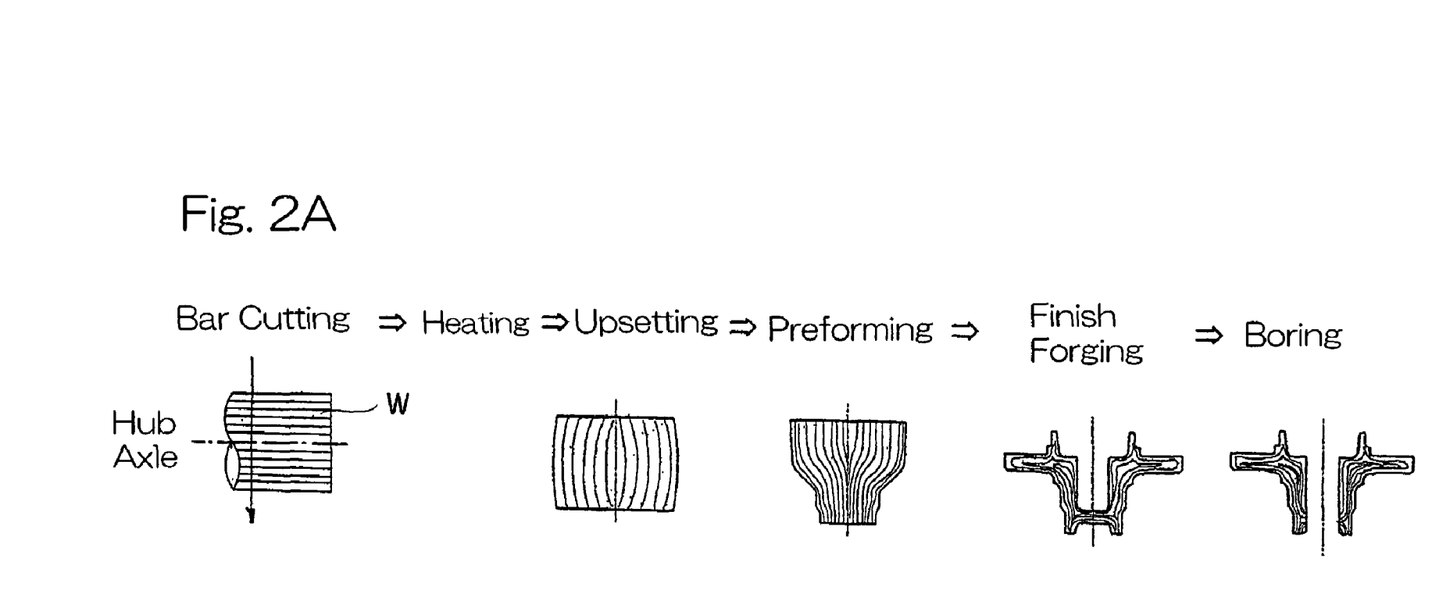
FIGS. 2A and 2B are explanatory diagrams showing a forging step applied to a hub axle and that applied to an outer race, respectively.
Figure 2B:
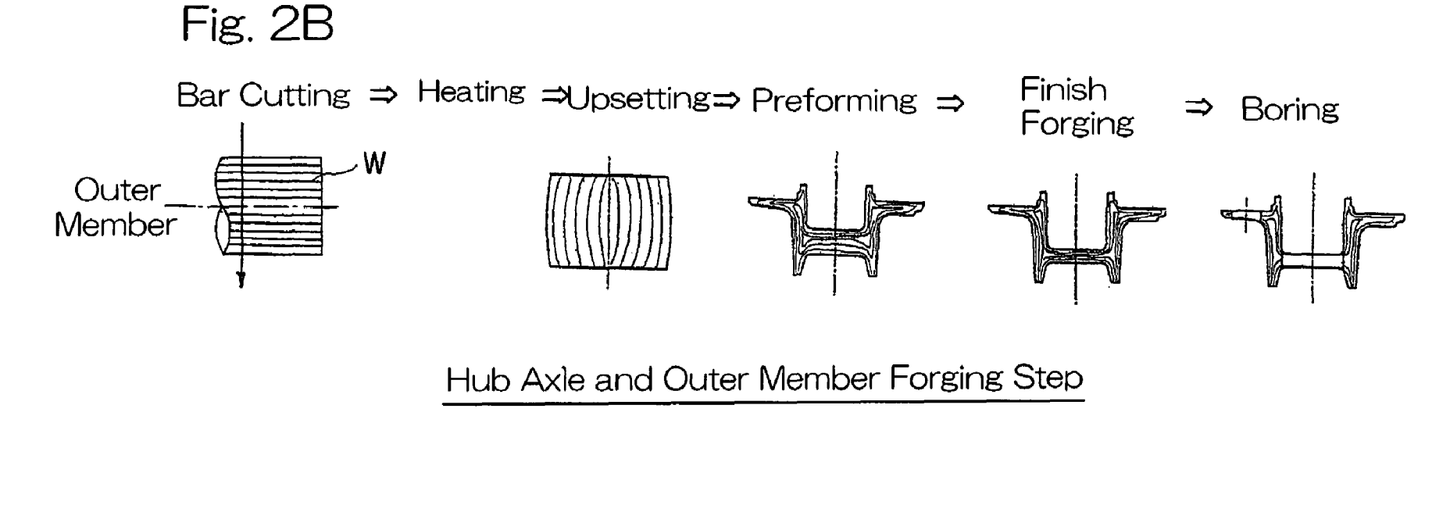
Figure 3:
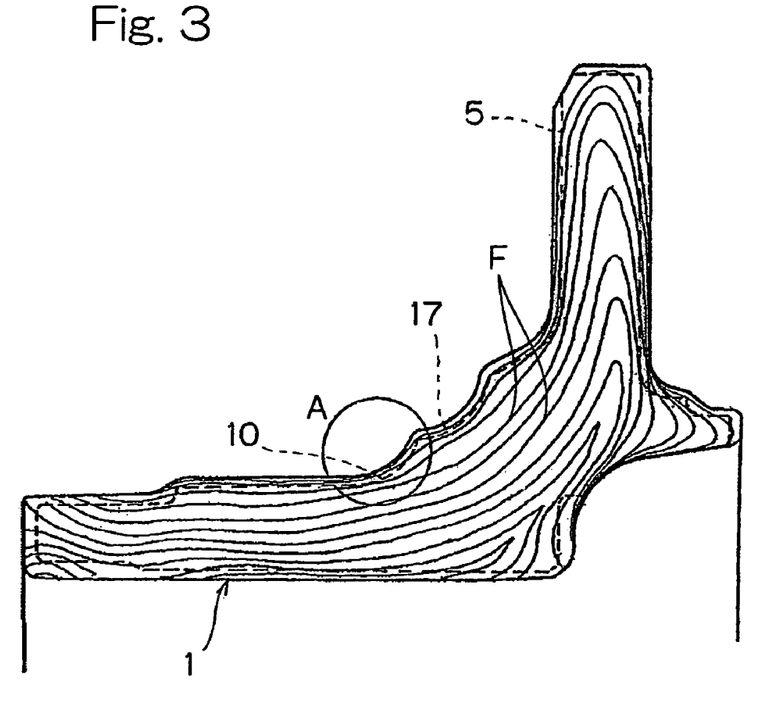
FIG. 3 is a sectional view of a material after completion of the forging step applied to the hub axle of the wheel support bearing assembly.
Figure 5:
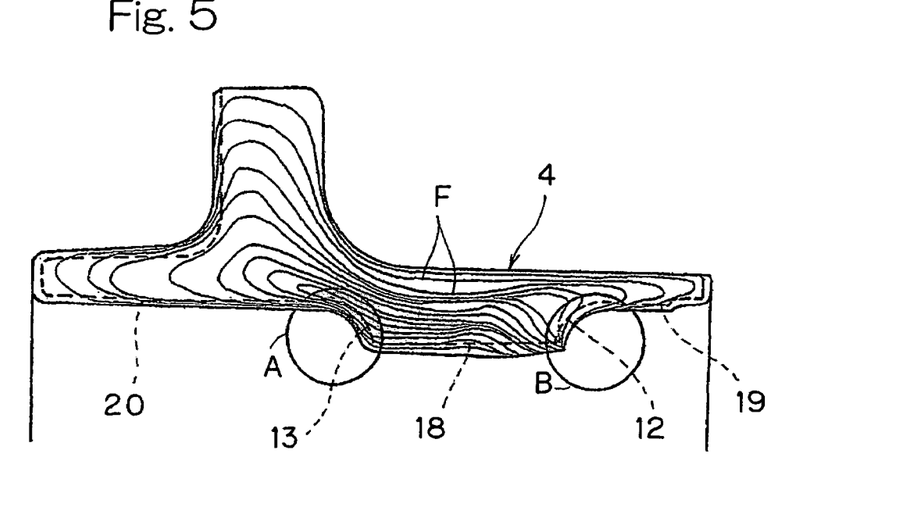
FIG. 5 is a sectional view of a material after completion of the forging step applied to the outer race of the wheel support bearing assembly.

The hub axle 1 and the outer member 4 are both manufactured by machining after having been forged. Material for each of the hub axle 1 and the outer member 4 is employed in the form of, for example, a bearing steel or a carburized steel or a carbon steel having a carbon content within the range of 0.4 to 0.8%. During the forging step, the hub axle 1 and the outer member 3 are manufactured in such a manner, as shown in FIGS. 2A and 2B, respectively, that a bar W of the above mentioned material cut to a predetermined size is heated to a temperature of about 1,100° C., then upset, roughly-shaped (preforming), final-shaped (finish-forging) and bored to render it to have a center bore. With this forging step, the hub axle 1 is processed to such a shape as shown in FIG. 3 and the outer member 4 is similarly processed to such a shape as shown in FIG. 5. In those figures, respective final shapes of the hub axle 1 and the outer member 4 after machining are shown by broken lines. Also, curves representing the fiber flow F are shown in FIGS. 3 and 5. The hub axle 1 of the final shape has the outer peripheral surface formed with a seal contact surface 17 of an arcuate sectional shape continued to the outboard raceway surface 10, which surface 17 is in turn continued towards a side face of the flange 5. A portion of the outer peripheral surface on an inboard side of the raceway surface 10 represents a sectional shape of a straight or cylindrical surface. The outer member 4 is so shaped as to have the raceway surfaces 12 and 13 of an arcuate sectional shape continued to opposite sides of a cylindrical surface area 18, at which the minimum diameter of the outer member 4 is exhibited. The outer member 4 is also shaped as to have cylindrical surface areas 19 and 20 that have a diameter slightly smaller than the maximum diameter of the raceway surfaces 12 and 13 and are continued from the raceway surfaces 12 and 13 towards the opposite ends of the outer member 4.

Figure 4:
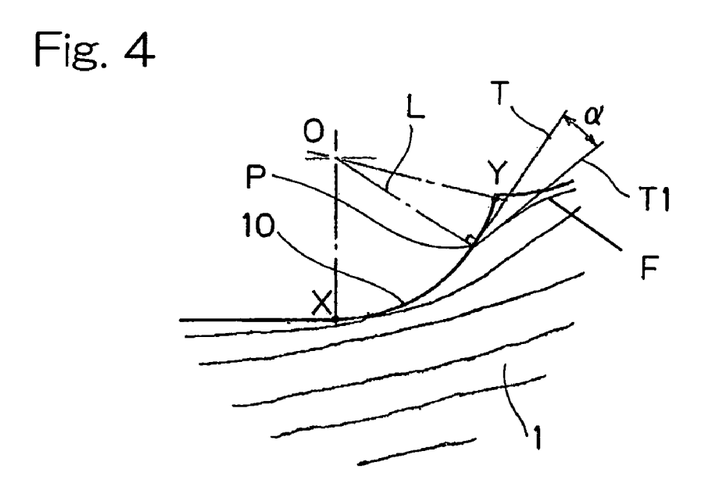
FIG. 4 is an enlarged sectional view, showing a portion marked by A in FIG. 3.
Figure 6A:
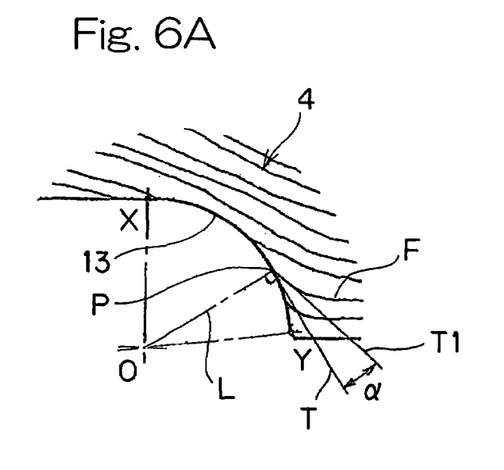
FIGS. 6A and 6B are enlarged sectional views, showing respective portions marked by A and B in FIG. 5.
Figure 6B:
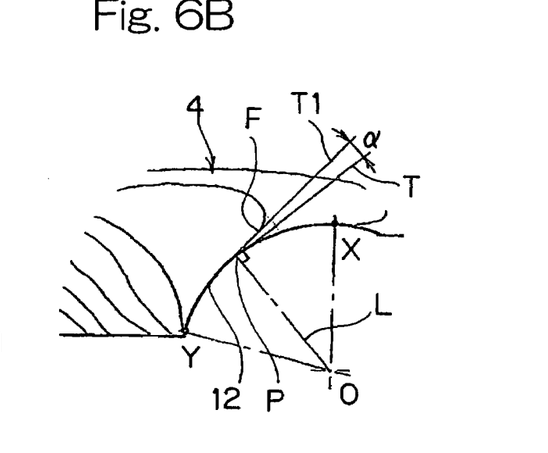

The raceway surface 10 of the hub axle 1 is shown on an enlarged scale in FIG. 4. The raceway surfaces 13 and 12 of the outer member 4 are shown on an enlarged scale in FIGS. 6A and 6B, respectively. As shown in FIG. 4, the angle $\alpha$ of fiber flow F relative to the raceway surface 10 of the hub axle 1 is equal to or smaller than 15° and preferably equal to or smaller than 10°. Also, as shown in FIGS. 6A and 6B, the respective angles $\alpha$ of fiber flow F relative to the raceway surfaces 12 and 13 of the outer member 4 are equal to or smaller than 15° and preferably equal to or smaller than 10°.

The fiber flow angle $\alpha$ relative to each of the raceway surfaces 10, 12 and 13 is defined as follows. Specifically, each of the raceway surfaces 10, 12 and 13 has the curvature with the center O. In the range of the curvature from an edge portion X in the bottom portion of each of the raceway surfaces 10, 12 and 13 where the curvature starts to another edge portion Y in the shoulder portion thereof, the straight line L is drawn so as to connect between the curvature center O and the point at which the section of the fiber flow F precipitates and, on the other hand, the tangential line T is drawn to pass in touch with the point P of intersection between the straight line L and each of the raceway surfaces 10, 12 and 13. The fiber flow angle $\alpha$ relative to the respective raceway surface 10, 12 and 13 is represented by the angle $\alpha$ formed between the tangential line T1 of the fiber flow F passing through each point P of intersection and the tangential line T of the respective raceway surface 10, 12 and 13. It is to be noted that where the raceway surfaces is tapered, a straight line extending along the section of the tapered surface defining the raceway surface, that is, the generatrix of the tapered surface is used in place of the tangential line T, and the angle formed between this generatrix and the tangential line T1 of the fiber flow F is defined as the fiber flow angle α. Also, where the tapered surface is crowned, the tangential line to the crowning curvature is used as the tangential line T.

The function of the above described construction will now be described. There is a correlation between the fiber flow angle α relative to the raceway surface 10, 12 or 13 and the rolling life. With increase of the fiber flow angle, the rolling life decreases. As a result of experiments and research, it has been found that selection of the angle α of fiber flow F of a value equal to or smaller than 15° in the case of the hub axle 1 and, similarly, selection of the angle α of fiber flow F of a value equal or smaller than 15° in the case of the outer member 4, are effective to increase the rolling life of the raceway surfaces 10, 12 and 13 as compared with those in the conventional art. Also, selection of the angle α of fiber flow F of a value equal to or smaller than 10° in the hub axle 1 and the outer member 4 has been found effective to further increase the rolling life of the raceway surfaces 10, 12 and 13. Reduction of the angles α of fiber flow F to the value equal to or smaller than 15° in the hub axle 1 and the outer member 4, as discussed above, can be attained by bringing the shape of the material after completion of the forging extremely close to the final shape. This in turn results in reduction of the machining allowance of each of the raceway surfaces 10, 12 and 13 and, accordingly, the weight of material used and the length of time required to accomplish the machining process can be reduced.

Figure 7A:
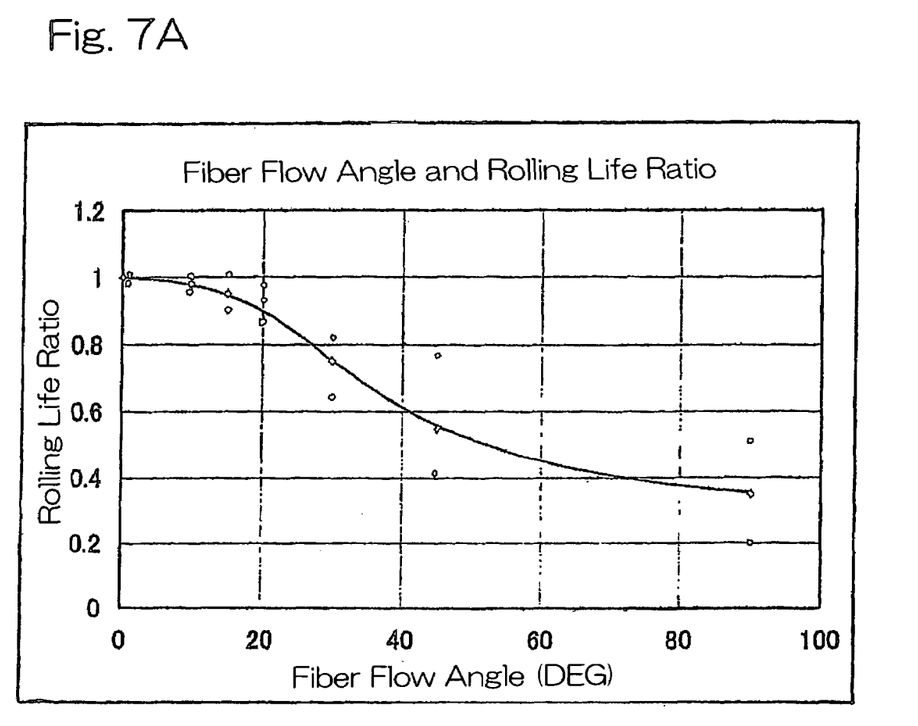
FIG. 7A is a chart showing the result of experiments.
Figure 7B:
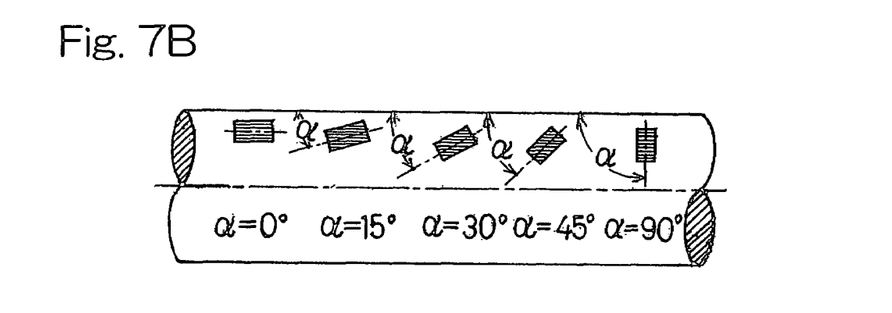
FIG. 7B is an explanatory diagram showing the relation between each of test pieces and axial direction of a rod material used as raw material.

FIG. 7A illustrates the results of experiments conducted with the use of rolling fatigue test pieces each cut off from the rod material to form the corresponding raceway surface, which results were obtained when the fiber flow angle relative to the raceway surface was 0°, 15°, 30°, 45° and 90°, respectively. FIG. 7B illustrates the relation between each of the test pieces and the axial direction of the rod material. Considering the rolling life ratio, FIG. 7A makes it clear that when the fiber flow angle is equal to or smaller than 15°, the rolling life is substantially equal to that when the fiber flow angle is 0° (ideal).

The method of measuring the fiber flow will now be described.

1. Procedure to Precipitate the Fiber Flow:

(1) Using a cutter, the hub axle and the outer race are each cut at a location in the axial direction to provide a test piece.

(2) The test piece is immersed into a bath containing a solution of hydrochloric acid (50% hydrochloric acid and 50% water) heated to 75 to 80° C.

(3) The test piece is immersed for 10 to 15 minutes.

(4) The test piece is removed, rinsed, dried and rust-proofed.

2. Determination of the Fiber Flow.

A section photograph of the raceway surface area showing the fiber flow so precipitated by the above procedure is taken and the angle of the fiber flow precipitated between the bottom portion and the shoulder portion of the raceway surface is determined at a magnification of 2 to 5.

Figure 8A:
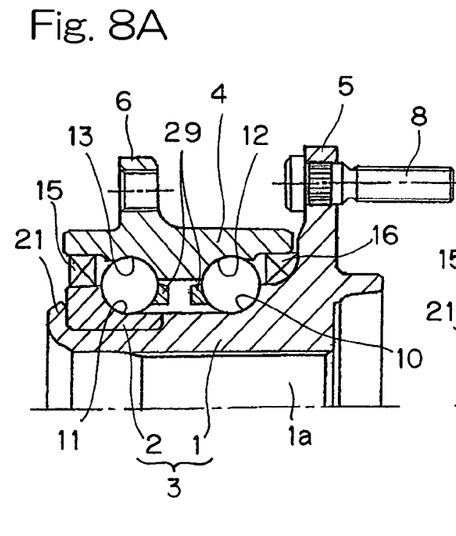
FIGS. 8A and 8B are fragmentary sectional views, showing different preferred embodiments of the present invention, respectively.
Figure 8B:
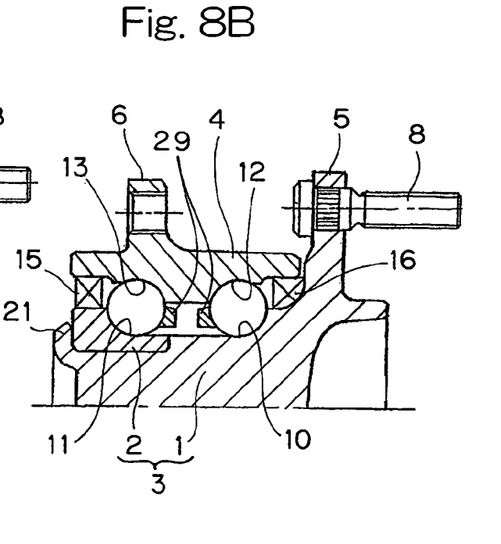

It is to be noted that although in the foregoing embodiment, the inner race segment 2 has been shown and described as press-fitted to the hub axle 1 or fixed thereto by the use of bolts (not shown), the inner race segment 2 may be fixed to the hub axle 1 by means of a staked portion 21 defined at the inboard end of the hub axle 1 as shown in FIG. 8A. Also, the wheel support bearing assembly may be that used to rotatably support an automotive driven wheel as shown in FIG. 8B. The wheel support bearing assembly shown in FIG. 8B is substantially identical with that shown in FIG. 8A, except that the hub axle 1 shown in FIG. 8B has no center bore 1a defined therein.

Also, although each of the foregoing embodiments has been described as applied to the wheel support bearing assembly of the third generation type, the present invention can be equally applied to the wheel support bearing assembly of a second generation type or a fourth generation type.

Figure 9A:
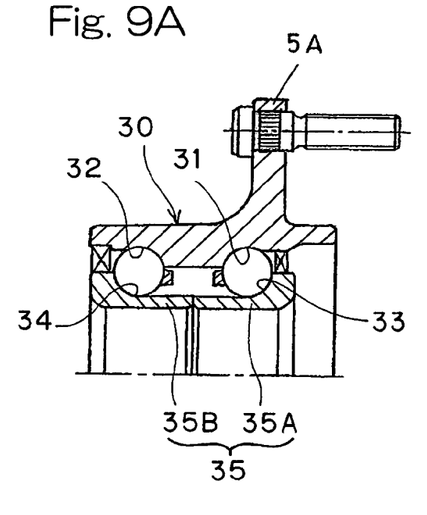
FIGS. 9A and 9B are fragmentary sectional views, showing further different preferred embodiments of the present invention, respectively.

FIG. 9A illustrates an example in which the present invention is applied to a second generation type wheel support bearing assembly of an outer race rotating model. This wheel support bearing assembly includes an outer member 30 in the form of an independent outer race and having raceway surfaces 31 and 32 defined in an inner periphery thereof, an inner member 35 having raceway surfaces 33 and 34 confronting the raceway surfaces 31 and 32, respectively, and dual rows of rolling elements 36 interposed between the mutually confronting raceway surfaces 31 and 33 and between the mutually confronting raceway surfaces 32 and 34, respectively. The inner member 35 is made up of juxtaposed inner races 35A and 35B having the raceway surfaces 33 and 34 defined therein, respectively. In the case of this outer race rotating model of the second generation type, a wheel mounting flange 5A is formed with an outboard end of the outer periphery of the outer member 30. In this example, the angle of the fiber flow (not shown) relative to each of the raceway surfaces 31 and 32 of the outer member 30 is chosen to be equal to or smaller than 15° and preferably equal to or smaller than 10°.

Figure 9B:
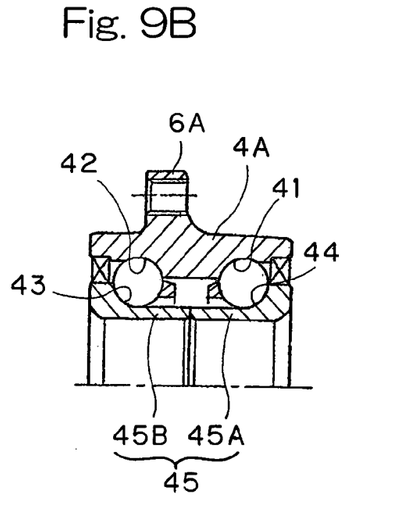

FIG. 9B illustrates an example of the inner race rotating mode of the second generation type. This wheel support bearing assembly includes an inner member 45 having raceway surfaces 43 and 44 confronting respective raceway surfaces 42 and 41 defined in an outer member 4A having a flange 6A, and dual rows of rolling elements 46 interposed between the mutually confronting raceway surfaces 41 and 44 and between the mutually confronting raceway surfaces 42 and 43, respectively. The inner member 45 is made up of juxtaposed inner races 45A and 45B having the raceway surfaces 44 and 43 defined therein, respectively. In this embodiment, the angle of the fiber flow (not shown) relative to each of the raceway surfaces 41 and 42 of the outer member 4A is chosen to be equal to or smaller than 15° and preferably equal to or smaller than 10°. In the case of this inner race rotating model of the second generation type, the inner races 45A and 45B are generally mounted externally on a hub axle (not shown) having a wheel mounting flange.

Figure 10:
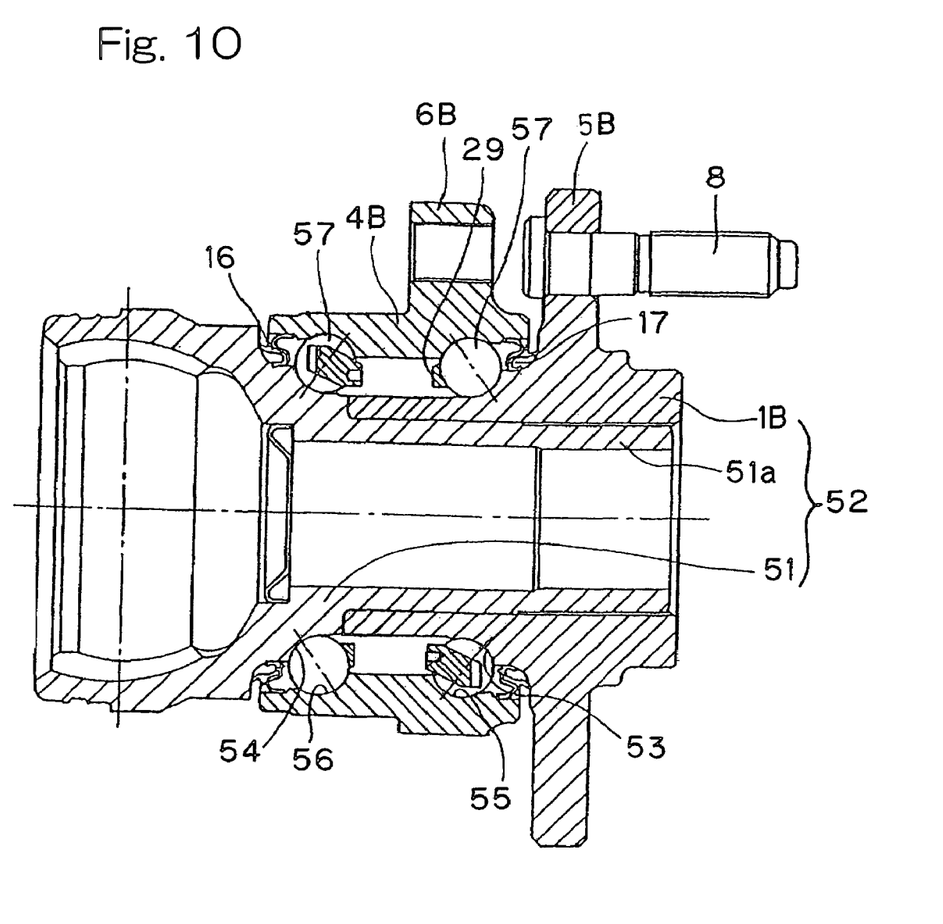
FIG. 10 is a fragmentary sectional view, showing a still further preferred embodiment of the present invention.

FIG. 10 illustrates an example of application to the wheel support bearing assembly of a fourth generation type. This wheel support bearing assembly includes an inner member 52, which is made up of a hub axle 1B having a wheel mounting flange 5B and an outer race 51 of a constant velocity universal joint having a shaft portion 51a engaged in an inner periphery of the hub axle 1B, with respective raceway surfaces 53 and 54 defined in the hub axle 1B and the constant velocity universal joint outer race 51. The wheel support bearing assembly also includes an outer member 4B having an outer periphery formed with a vehicle body fitting flange 6B and an inner periphery formed with raceway surfaces 55 and 56 that confront the raceway surfaces 53 and 54, respectively. Rows of rolling elements 57 are interposed between the mutually confronting raceway surfaces 53 and 55 and between the mutually confronting raceway surfaces 54 and 56. In this embodiment, the angle of the fiber flow (not shown) relative to each of the raceway surfaces 55 and 56 of the outer member 4B is chosen to be equal to or smaller than 15°. Also, the angle of the fiber flow (not shown) relative to the raceway surface 53 of the hub axle 1B is chosen to be equal to or smaller than 10°. It is, however, to be noted that it is sufficient for the angle of the fiber flow (not shown) relative to the raceway surface 53 of the hub axle 1B to be equal to or smaller than 15° and the angle of the fiber flow (not shown) relative to each of the raceway surfaces 55 and 56 of the outer member 4B is preferably equal to or smaller than 10°.

It is to be noted that although in describing each of the foregoing embodiments reference has been made to the ball type wheel support bearing assembly, the present invention can be equally applied to the wheel support bearing assembly of a tapered roller bearing type.

Also, in the practice of the present invention, the requirement that the angle of the fiber flow relative to the raceway surface be equal to or smaller than 15° or 10° has to be satisfied substantially over the entire circumference of the raceway surface.

What is claimed is:

1. A wheel support bearing assembly for rotatably supporting an automotive wheel relative to a vehicle body structure, comprising:
    an outer member having an outer periphery formed with a flange and an inner periphery formed with raceway surfaces;
    an inner member formed with raceway surfaces confronting the associated raceway surfaces in the outer member;
    double rows of rolling elements interposed between the raceway surfaces in the inner member and the raceway surfaces in the outer member, respectively; and
    a sealing unit to seal opposite open ends of an annular bearing space delimited between the outer and inner members,
    wherein the inner member includes a hub axle formed with one of the raceway surfaces and a wheel mounting flange,
    wherein the hub axle and the outer member have fiber flows with some thereof being cut off at and exposed to the raceway surface, and
    wherein the angle of so exposed fiber flows relative to at least one of the raceway surface in the hub axle and the raceway surfaces in the outer member is chosen to be equal to or smaller than 15°.

2. The wheel support bearing assembly as claimed in claim 1, wherein the other of the raceway surfaces of the inner member is formed on an inner race segment that is mounted on an outer periphery of one end of the hub axle.

3. The wheel support bearing assembly as claimed in claim 1, wherein the hub axle is made of a bearing steel or a carburized steel or a carbon steel having a carbon content within the range of 0.4 to 0.8%.

4. The wheel support bearing assembly as claimed in claim 1, wherein the outer member is made of a bearing steel or a carburized steel or a carbon steel having a carbon content within the range of 0.4 to 0.8%.

5. A wheel support bearing assembly for rotatably supporting an automotive wheel relative to a vehicle body structure, comprising:
    an outer member having an inner periphery formed with raceway surfaces;
    an inner member formed with raceway surfaces confronting the associated raceway surfaces in the outer member;
    dual rows of rolling elements interposed between the raceway surfaces in the inner member and the raceway surfaces in the outer member, respectively; and
    sealing unit to seal opposite open ends of an annular bearing space delimited between the outer and inner members,
    wherein the inner member includes a hub axle formed with one of the raceway surfaces and a wheel mounting flange,
    wherein the hub axle has fiber flows with some thereof being cut off at and exposed to the raceway surface, and
    wherein the angle of so exposed fiber flows relative to the raceway surface in the hub axle is chosen to be equal to or smaller than 15°.

6. The wheel support bearing assembly as claimed in claim 5, wherein the other of the raceway surfaces of the inner member is formed on an inner race segment that is mounted on an outer periphery of one end of the hub axle.

7. The wheel support bearing assembly as claimed in claim 5, wherein the hub axle is made of a bearing steel or a carburized steel or a carbon steel having a carbon content within the range of 0.4 to 0.8%.

8. A wheel support bearing assembly for rotatably supporting an wheel relative to a vehicle body structure, comprising:
    an outer member having an outer periphery formed with a flange and an inner periphery formed with raceway surfaces;
    an inner member formed with raceway surfaces confronting the associated raceway surfaces in the outer member;
    dual rows of rolling elements interposed between the raceway surfaces in the inner member and the raceway surfaces in the outer member; and
    a sealing unit to seal opposite open ends of an annular bearing space delimited between the outer and inner members,
    wherein the outer member has fiber flows with some thereof being cut off at and exposed to the raceway surface, and
    wherein the angle of so exposed fiber flows relative to each of the raceway surfaces in the outer member is chosen to be equal to or smaller than 15°.

9. The wheel support bearing assembly as claimed in claim 8, wherein the inner member includes two inner races having respective raceway surfaces confronting the raceway surfaces provided in the outer member.

10. The wheel support bearing assembly as claimed in claim 8, wherein the outer member is made of a bearing steel or a carburized steel or a carbon steel having a carbon content within the range of 0.4 to 0.8%.

* * * * *